(12) United States Patent
Rosko (10) Patent No.: US 7,137,410 B2
(45) Date of Patent: Nov. 21, 2006

(54) MIXING VALVES

(75) Inventor: M. Scot Rosko, Greenwood, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 120 days.

(21) Appl. No.: 10/930,256

(22) Filed: Aug. 31, 2004

(65) Prior Publication Data

US 2006/0042704 A1 Mar. 2, 2006

(51) Int. Cl.
*F16K 11/078* (2006.01)

(52) U.S. Cl. .............. 137/625.17; 137/625.4; 137/636.1; 137/636.2; 251/285; 251/288

(58) Field of Classification Search .......... 137/625.17, 137/625.4, 636.1, 636.2; 251/285, 288
See application file for complete search history.

(56) References Cited

U.S. PATENT DOCUMENTS

| | | | |
|---|---|---|---|
| 1,299,586 A | 4/1919 | Leibing | |
| 3,628,570 A | 12/1971 | Andis | |
| 3,823,742 A | 7/1974 | Von Corpon | |
| 3,915,195 A | 10/1975 | Manoogian et al. | |
| 4,200,123 A | 4/1980 | Brandelli | |
| 4,387,880 A | 6/1983 | Saarisalo et al. | |
| 4,700,928 A * | 10/1987 | Marty | 251/310 |
| 4,838,304 A * | 6/1989 | Knapp | 137/454.6 |
| 4,901,750 A * | 2/1990 | Nicklas et al. | 137/270 |
| 5,018,553 A | 5/1991 | Grassberger et al. | |
| 5,095,934 A * | 3/1992 | Iqbal | 137/270 |
| 5,386,852 A | 2/1995 | Bosio | |
| 5,417,242 A * | 5/1995 | Goncze | 137/625.17 |
| 5,477,885 A | 12/1995 | Knapp | |
| 5,592,971 A | 1/1997 | Knapp | |
| 5,615,709 A | 4/1997 | Knapp | |
| 5,967,184 A | 10/1999 | Chang | |
| 6,170,523 B1 * | 1/2001 | Chang | 137/625.17 |
| 6,293,299 B1 | 9/2001 | Nelson | |
| 6,626,203 B1 * | 9/2003 | Schneider | 137/270 |

\* cited by examiner

*Primary Examiner*—Eric Keasel
*Assistant Examiner*—Craig Price
(74) *Attorney, Agent, or Firm*—Woodard, Emhardt, Moriarty, McNett & Henry LLP (57) ABSTRACT

A single handle mixing valve of the plate valve type where a single stem controls both the temperature and flow output from the valve. A control said characteristic plate having an opening is positioned over the stem and has at least one surface defining limits of stem movement. An actuating ring positioned within an exterior cover for the mixing valve has inwardly facing cam surfaces, which interact with the control plate to adjust either maximum temperature or maximum flow from the valve. The actuating ring has a tab extending to the outside of the exterior cover for convenient operator manipulation without the need for disassembly or the use of tools.

10 Claims, 6 Drawing Sheets

MIXING VALVES

BACKGROUND OF THE INVENTION

The present invention relates to mixing valves and more particularly to valve devices for setting limits on the characteristics of the fluid emanating from the mixing valve.

The single-handled mixing valve has been a fixture of plumbing for well over forty years. It established new standards in terms of consumer convenience since both the temperature and the flow rate of the mixture could be controlled by a single element. Such valves fall into two broad categories, the first a ball valve and the second a plate valve.

A ball valve comprises a stem connected to a spherical valve and moveable through a range of motions to allow appropriate registry of hot and cold inlet passages with a mixed flow output. This type of valve is renowned for its reliability since the stem is rigidly connected to the sphere and moveable parts are kept to a minimum. While a number of proposals have been made to limit maximum temperatures, these proposals either require use of tools and/or disassembly of the entire unit to change maximum temperature settings.

The second form of a plate valve comprises a plate moveable in two directions to provide variable registry with hot and cold inlet passages and a common output. The plate is moved through this range of displacement by a stem and a corresponding actuating mechanism.

In this era of consumer awareness, several control features are deemed to be necessary. One feature is to set an external limit on temperature so as to prevent inadvertent manipulation to a temperature output higher than is appropriate for the user. The second feature is that in some areas where the water supply is particularly scarce and expensive, it is important to place a limit on the maximum flow from such a valve. Again, it is desirable to achieve an adjustable maximum for these values without special tools or disassembly.

SUMMARY OF THE INVENTION

The invention concerns a valve having an exterior cover and a valve element within the housing for receiving fluid input and being moveable to control the characteristic of fluid flow from the valve element. The stem is connected to the valve element and is moveable to direct movement of the valve element to control said characteristic of said fluid flow. A control element adjacent to the stem has a predetermined surface which sets the limit of movement of the stem in at least one given direction. An actuating element is connected to the control element to translate movement of the actuating element into movement of the predetermined surface in a direction to vary the limit of travel of the stem toward a position resulting in a limiting value of said characteristic of said fluid flow. The actuating element is positioned in the exterior cover and is adapted for direct operator manipulation from the outside of the exterior cover.

DESCRIPTION OF THE SELECTED EMBODIMENT

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, systems or devices, and any further applications of the principles of the invention as described herein, are contemplated as would normally occur to one skilled in the art to which the invention relates.

Figure 1:
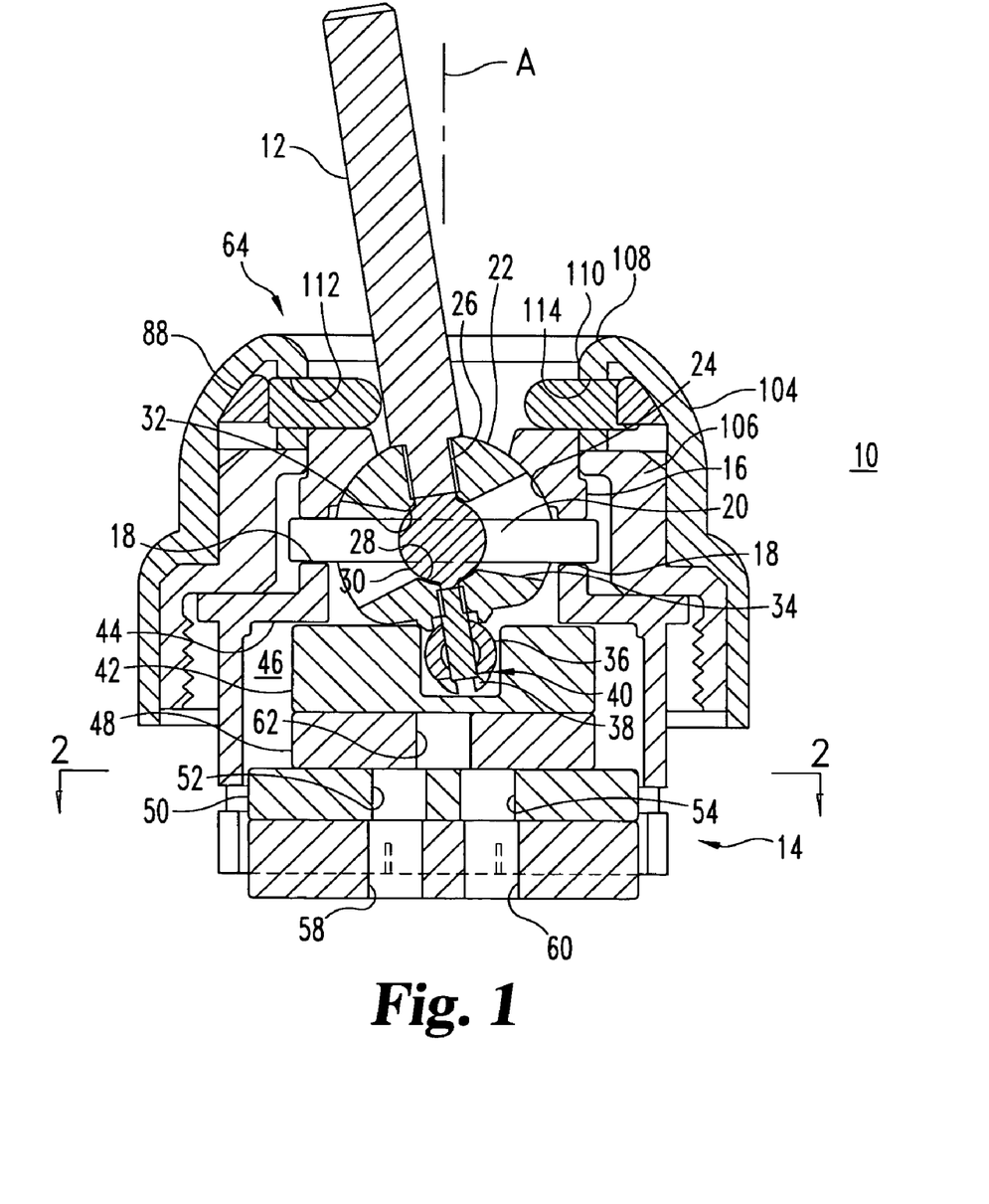
FIG. 1 is a longitudinal cross-section view of a mixing valve embodying the present invention.

FIG. 1 illustrates a mixing valve generally indicated by reference character 10. Mixing valve 10 is herein described as a valve controllable by a single stem 12 to provide movement of a valve assembly, generally indicated by reference character 14, to control both the quantity and temperature of an output mixture. As illustrated, valve assembly 14 is a plate valve that is one of the two general types of mixing valves having a single control stem. It should be apparent to those skilled in the art, however, that the invention can be applied equally to mixing valves having a spherical ball for controlling mixture temperature and volume.

Valve assembly 14 comprises an annular housing 16 having a pair of aligned bores 18 receiving a pin 20 which acts as a pivot for a sphere 22 received within a hemispherical recess 24 of housing 16. Stem 12 is secured to sphere 22 at threads 26 so that the movement of stem 12 causes sphere 22 to pivot. Pin 20 extends through a bore 28 in a second pin 30 positioned at right angles to pin 20. Pin 30 is received in a bore 32 through sphere 22 so that sphere 22 may rotate from side to side as shown in FIG. 1 by pivoting about pin 30. It may also move into and out of the plane of FIG. 1 by virtue of pivoting about pin 20. Slots 34 in sphere 22 accommodate the side to side movement. The end of movement of stem 12 is translated into valve displacement by a ball 36 secured to the lower section of sphere 22 by a screw 38. Ball 36 is received within a recess 40 of a valve support base 42 moveable across a shoulder 44 of chamber 46 within housing 16. Ball 36 has an appropriate anti-rotation interconnection with valve base 42 so that valve base 42 can only move in an X and Y direction and not rotate about a vertical central axis A. Valve base 42 supports a mixing plate valve 48 slideable on a corresponding plate 50 defining inlet and outlet flow passages as particularly shown in FIG. 2. Continuing to refer to FIG. 2, opening 52 allows cold fluid in and passage 54 admits hot fluid. Crescent shaped passage 56 permits a mixture of flow from the passages. As shown in FIG. 1, opening 52 connects with cold fluid input 58 and opening 54 connects with hot fluid inlet 60. The mixing flow outlet passage connecting with opening 56 is not shown to simplify the understanding of the invention.

Figure 2:
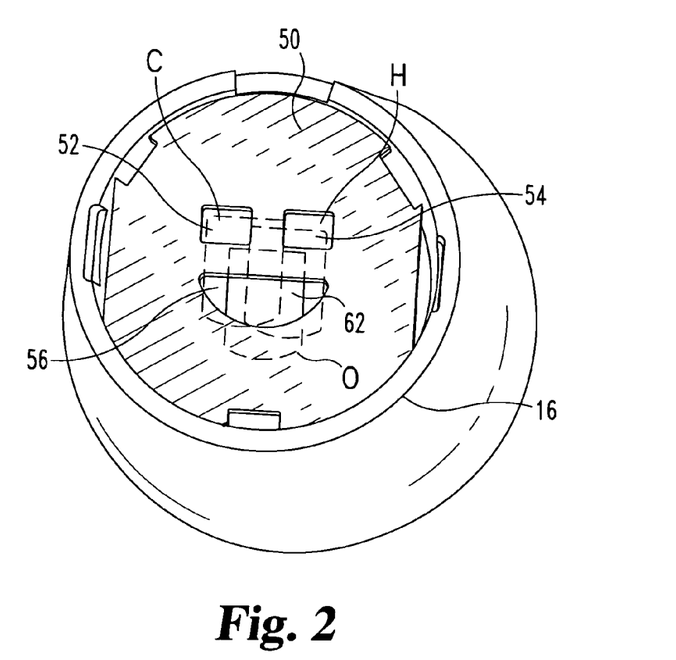
FIG. 2 is a cross section view of the valve of FIG. 1 taken on lines 2—2 of FIG. 1.

As shown in FIG. 2, the valve plate 48 has a control opening 62. The position of control opening 62, as determined by movement of the stem 12, can provide no flow or maximum hot or cold flow. As shown in the phantom line O in FIG. 2, flow from both hot and cold is prevented. The phantom line H shows full hot flow and the phantom line C shows full cold flow. The stem 12 is moveable within a range of flow and temperature ranges as desired by a consumer.

Figure 3:
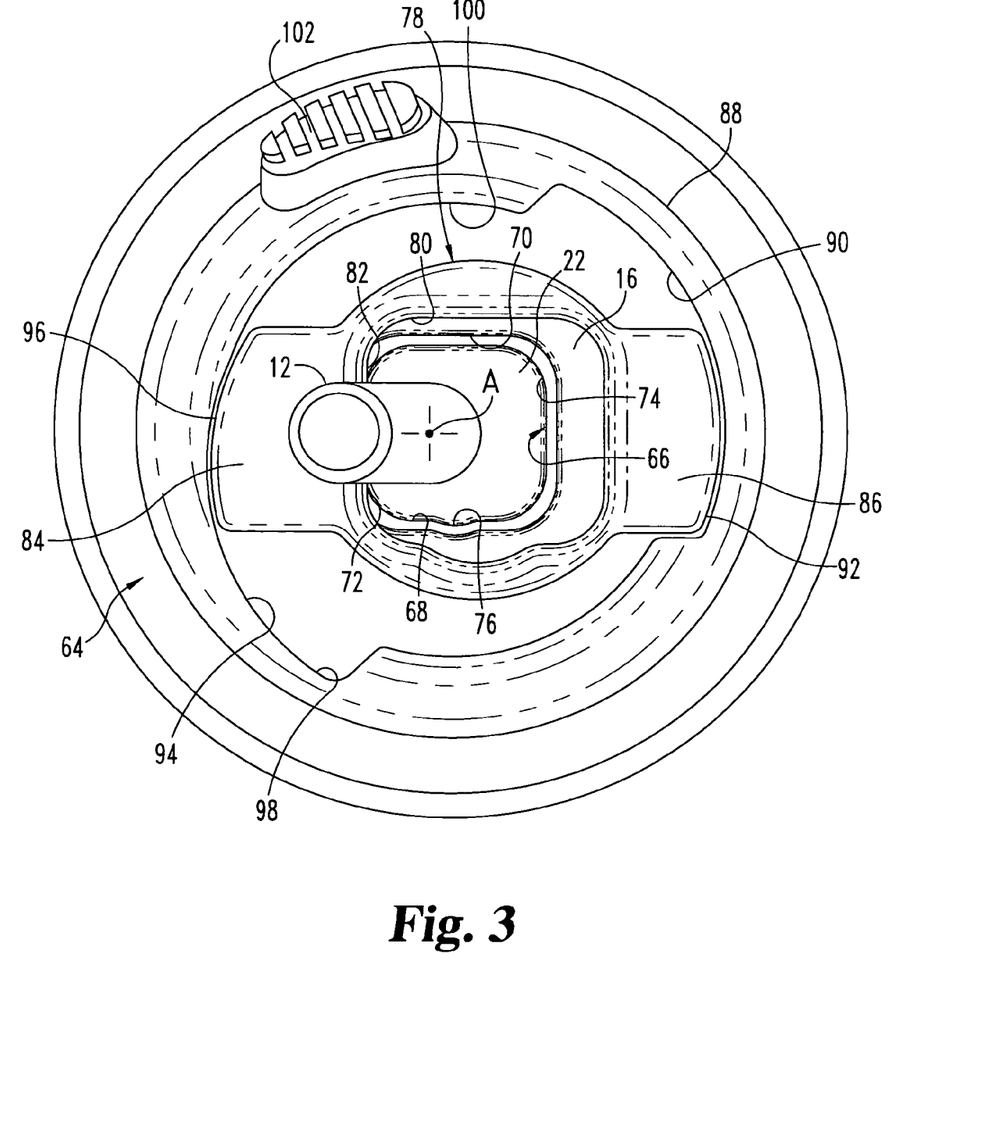
FIG. 3 is an end view of the mixing valve of FIG. 1 with an exterior cover removed.
Figure 4:
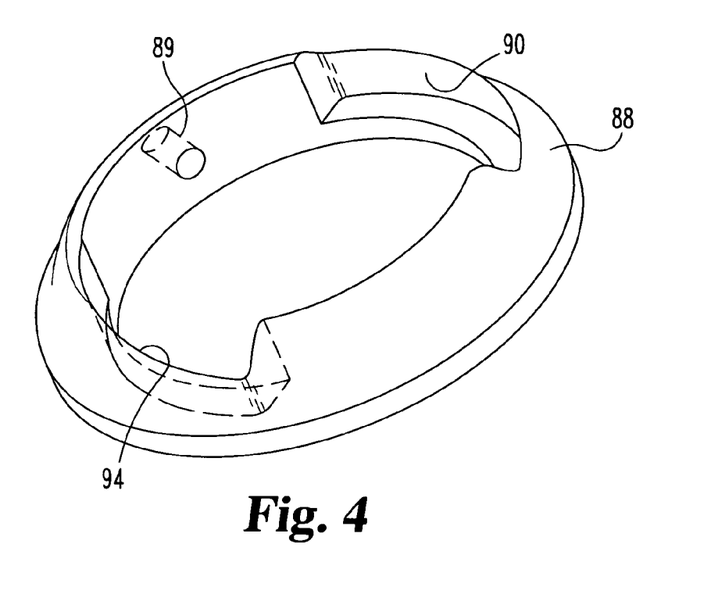
FIG. 4 is an actuating element used with the mixing valve of FIG. 1.

As indicated above, there are instances when either the maximum temperature or maximum flow or a combination of both may be desired to be limited. To accomplish this end without special tools or disassembly, the device generally indicated by reference character 64 and particularly shown in FIG. 3 is employed. As shown in FIG. 3, the normal limit of movement for stem 12 is confined within a generally rectangular opening 66 defined by a first side 68 representing a zero flow position and a opposed side 70 representing a maximum flow position. A third side 72 represents a maximum temperature and an opposed final side 74 represents a lowest temperature condition. A detent 76 is formed on side 68 to provide a reference for the mid-point of temperature. A control element 78 has an opening 80 through which stem 12 extends. Opening 80 has a configuration following the configuration of opening 66, including detent 76. Opening 80 has a control edge 82, which is used to define the maximum displacement of stem 12 to the left as viewed in FIG. 3, and therefore the maximum temperature output from the mixing valve 10. As will be described later, control element 78 is constrained to movement in a radial direction relative to the central axis A.

Control element 78 is in a plate form and has first and second tabs 84 and 86 extending outward from opening 80. Tabs 84 and 86 interact with camming surfaces on an actuating ring 88 adapted to rotate about central axis A. Actuating ring 88 has a first inwardly facing cam surface 90 having a constant radius with respect to central axis A. Cam surface 90 interacts with the circular configuration end face 92 of tab 86. Actuating ring 88 has a second, inwardly facing cam surface 94, which interacts with end face 96 of tab 84. Cam surfaces 90 and 94 are generally opposed to one another. Cam surface 94 has a radius with respect to central axis A, which decreases from a maximum at 98 to a minimum at 100. End surface 96 of tab 84 is configured to conform to cam surface 94. When the actuating ring 88 is in the position illustrated in FIG. 3, the cam surface 94 acts on tab 84 to limit movement to the left as viewed in FIG. 3. Accordingly, the maximum temperature allowed to be set by movement of stem 12 to the left is established lower than the maximum temperature permitted by valve assembly 14 by itself. When actuating ring 88 is moved in a clockwise direction as viewed in FIG. 3, the control element 78 is permitted leftward movement because of the increased radius of cam surface 94 to a point where no limits on maximum temperature are set by the control element 78. The use of the constant radius cam surface 90 and increasing radius cam surface 94 prevent binding of the cam mechanism. A tab 102 secured to actuating ring 88 permits operator manipulation of actuating ring 88 from the exterior of the mixing valve as described below.

Referring back to FIG. 1, an exterior cover 104 is mounted over a retention housing 106 that holds housing 16 in place by an appropriate device (not shown). Exterior cover 104 has an upper opening 108 defined by a downwardly extending lip 110 which terminates adjacent to retention housing 106. Lip 110 has a pair of opposed slots 112 and 114 spaced 180 degrees from one another relative to central axis A that receive tabs 84 and 86, respectively. Slots 112 and 114 are arranged so that control element 78 is restrained from rotation relative to central axis A. Also as shown in FIG. 1, the actuating ring 88 is retained in the annular space between the lip 110, exterior cover 104 and retention housing 106. Tab 102 extends through a slot 116, shown particularly in FIG. 5, for convenient manipulation by an operator. Appropriate indices 117 are provided along slot 116 to visually indicate to what degree maximum temperature is being limited. Tab 102 is affixed to actuating ring 88 after it is positioned within exterior cover 104 by an appropriate fastening means through bore 89 in ring 88. Thus it is seen that the maximum temperature of the output mixture may be easily adjusted by an operator without disassembly of the valve. This has the benefit of more readily being utilized to prevent inadvertent movement to an inappropriately high temperature.

Figure 6:
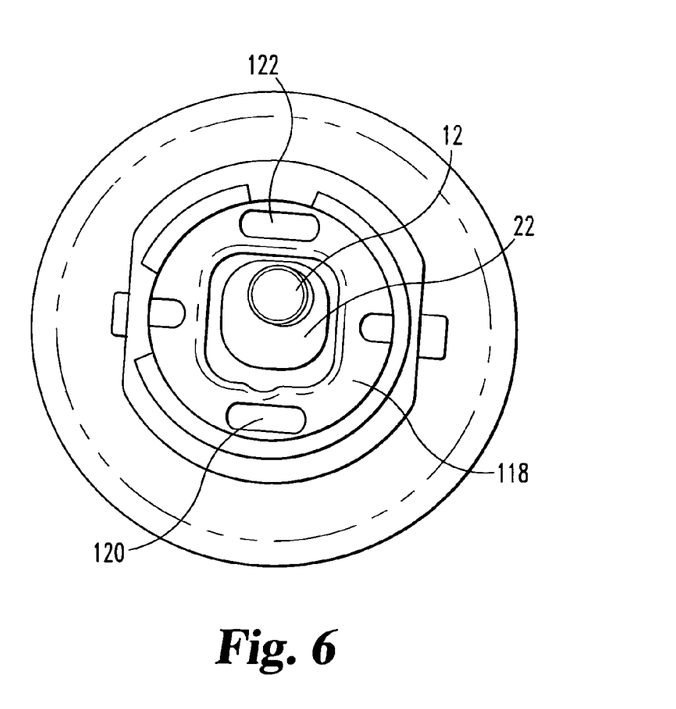
FIG. 6 is an end view of a mixing valve exterior cover incorporating an alternative embodiment of the present invention.
Figure 7:
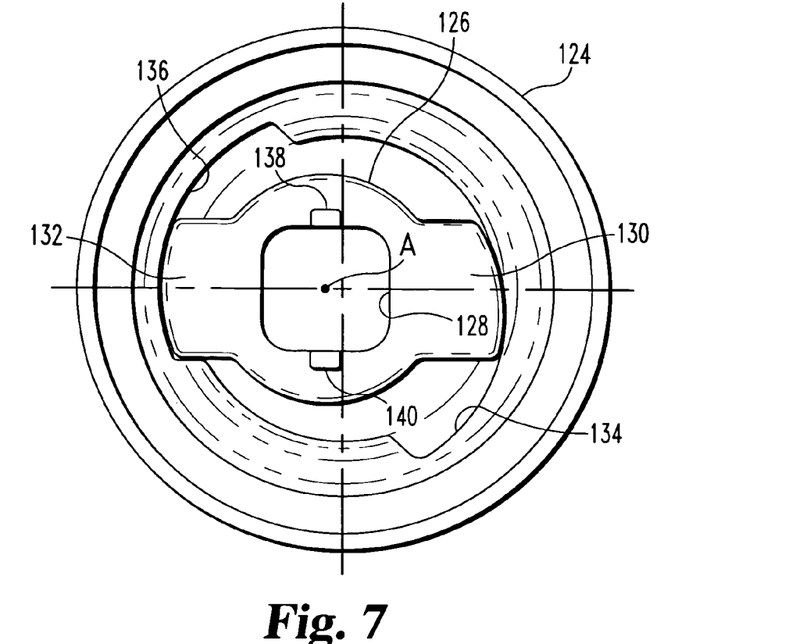
FIG. 7 is an end view of an exterior cover and control element used with the mixing valve embodiment of FIG. 6.
Figure 8:
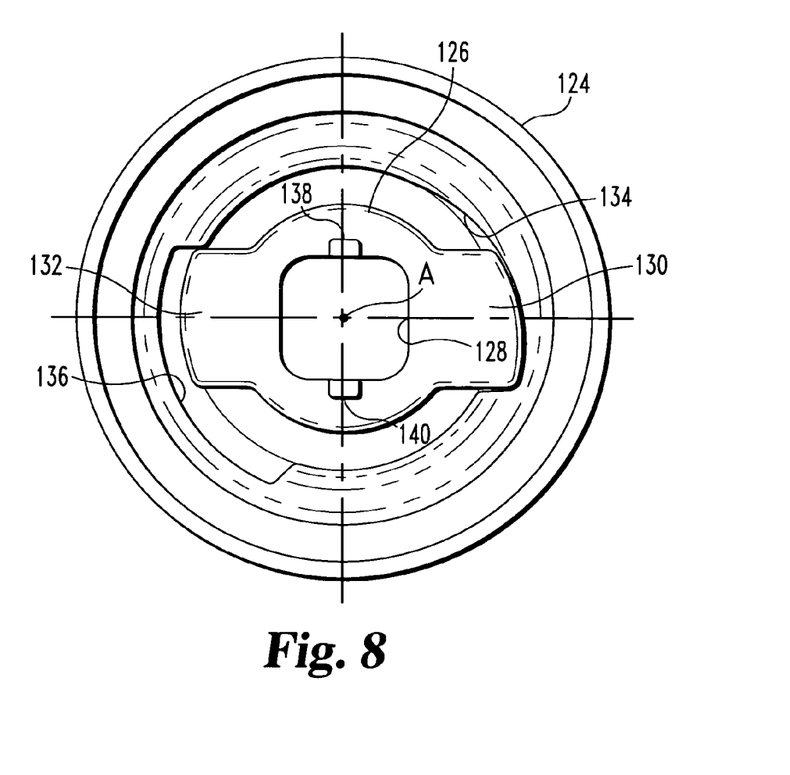
FIG. 8 is an end view of the exterior cover and control element of FIG. 7 but with the control element in a different position.

The embodiment illustrated in FIG. 1 through FIG. 5 shows a control of maximum temperature where a discrete actuating ring is positioned within exterior cover 104. The embodiment shown in FIG. 6 through 8 shows an arrangement where the cam surfaces of actuating ring 88 are formed integrally with the exterior cover so that control of maximum temperature is effected by rotating the entire exterior cover. In describing these figures, parts and components identical to the embodiment of FIG. 1 through FIG. 5 will be described with identical reference characters. In FIG. 6, the stem 12 and sphere 22 extend from housing 118. Housing 118 has a pair of parallel slots 120 and 122 on opposite sides of stem 12. FIG. 6 is oriented in the same fashion as FIG. 3 so that the maximum temperature is controlled by movement of stem 12 to the left. FIG. 7 and FIG. 8 show the interior of an exterior cover 124 normally positioned over housing 118 and stem 12. Exterior cover 124 is removed from housing 118 to show a control element 126. Control element 126 has an opening 128 configured like the opening 80 in control element 78. Control element 126 has tabs 130 and 132, which are received in, opposed inwardly facing integral cam surfaces 134 and 136 respectively. In order for control plate 126 to be restrained from rotation about central axis A, a pair of guide protrusions 138 and 140 are provided which are respectively received in slots 122 and 120 on base 118. Thus when exterior cover 124 is in place over base 118, guide protrusions 138 and 140 cooperate with the slots 122 and 120 to cause movement of control plate 126 to be in a radial direction only relative to central axis A. Cam surfaces 134 and 136 are configured like the corresponding cam surfaces 90 and 94 of control element 78 to provide the limits on movement described above. When exterior cover 124 is retained over housing 118 by a suitable retention means (not shown), control element 126 is in place and rotational movement of the entire housing 124 causes the cam surface to move to limit maximum output temperature by limiting movement of stem 12. Suitable indicia (not shown) are provided on the outside of exterior cover 124 to give an operator an indication of the extent to which maximum temperature is controlled.

The embodiments of FIG. 1 through FIG. 5 and FIG. 6 through 8 show control of maximum temperature. With appropriate repositioning of the control and actuating elements, they may also be used to control the maximum flow output where flow is an important consideration. For example; the control element 78 and actuating element 88 of FIG. 3 could be reoriented 90 degrees clockwise relative to stem 12 so that a limit is placed on maximum flow instead of maximum temperature.

Figure 9:
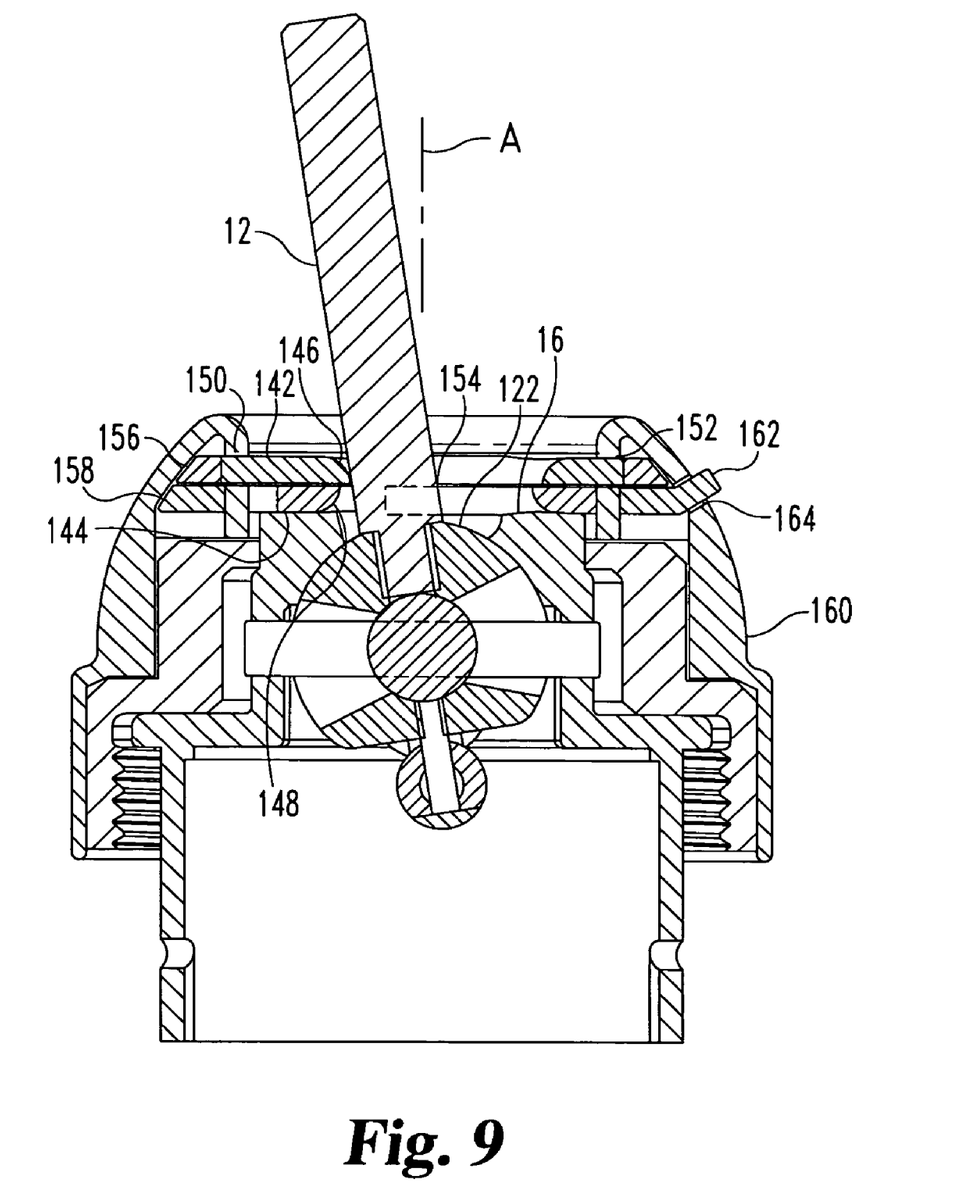
FIG. 9 is a longitudinal cross section view of a mixing valve showing still another alternative of the present invention.

The embodiment shown in FIG. 9 provides an additional capability by allowing independent control of both temperature and flow output. In describing FIG. 9, the mixing control portion is eliminated to simplify the understanding of the invention. In addition, the discussion of cam surfaces and appropriate interaction with the tabs is not included since it is substantially identical to that shown in the previous figures. In addition, elements common to those in previous figures will be given common reference characters.

The embodiment of FIG. 9 shows a pair of control elements 142 and 144 each having the control openings 146 and 148 respectively. Control element 142 has integral tabs which are received in opposed slots 150 and 152 to limit its movement in a direction to the left and right as shown in FIG. 9 relative to central axis A. The second element 144 has tabs (not shown) which are received in slots 154 shown in dashed lines in FIG. 9. As illustrated, Plate 144 is restrained for movement into and out of the plane of FIG. 9 and is generally at right angles to the movement of control element 142. Control elements 142 and 144 interact with inwardly facing cam surfaces on stacked actuating rings 156 and 158, respectively.

The cam surfaces on actuating rings 156 and 158 are opposed and face inwardly like the cam surfaces for the embodiments of FIG. 1–5 and FIG. 6–8. The configuration of the cam surfaces on rings 156 and 158 may be like those of the previous embodiments or any other coordinated shape that produces a given displacement of control elements 142 and 144 in response to rotatable movement of actuating rings 156 and 158.

Figure 5:
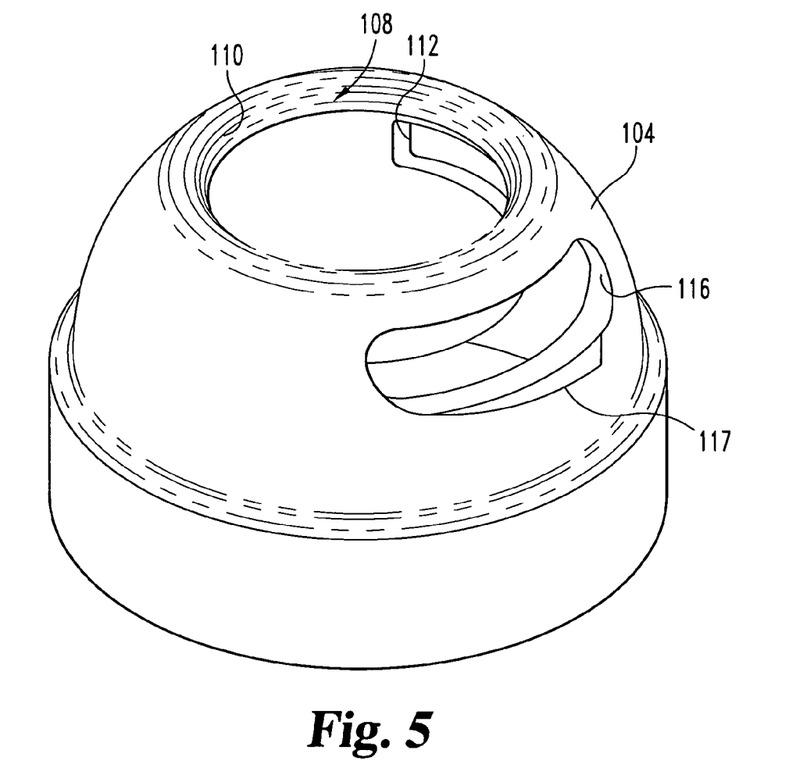
FIG. 5 is a perspective view of the exterior cover of the mixing valve of FIG. 1.

Actuating ring 156 is manipulated toward circular movement by a tab (not shown) projecting from the outside of exterior cover 160 in a fashion like that shown in FIG. 3 and FIG. 5. Actuating ring 158 has a tab 162, which extends through a slot 164 in external housing 160 to control circular movement of actuating ring 158 independent of actuating ring 156. Actuating ring 156 displaces control element 142 to limit maximum temperature by limiting movement of stem 12 to the left as shown in FIG. 3. Control element 144 is moveable by actuating ring 158 to control maximum flow output by moving the maximum flow surface downward as shown in FIG. 3.

It is thus seen that a mechanism has been described to achieve plural or alternate control of maximum flow or temperature without the need for disassembly of a mixing valve or a need for special tools.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A mixing valve having an exterior cover, said mixing valve comprising:
    a valve element within said housing and receiving hot and cold fluid input and being moveable to control at least one of the outlet temperature and flow rate of an outlet fluid mixture from said valve element,
    a stem interconnected with said valve element and extending therefrom, said stem being moveable to direct movement of said valve element to control at least one of outlet temperature and flow rate,
    a control element adjacent to said stem and having a predetermined surface setting the limit of movement of said stem in at least one given direction, said control element being a plate positioned within said cover, and
    an actuating element connected to said control element to translate circular movement of said actuating element into linear movement of said predetermined surface in a direction to vary the limit of travel of said stem towards a position resulting in at least one of a maximum temperature and flow rate of said outlet mixture, said actuating element being positioned in said exterior cover, said actuating element having at least one internally facing cam surface and said control plate interacts with said cam surface to provide translation of said control plate in response to circular movement of said cam surface about a central axis.

2. Apparatus as claimed in claim 1 wherein said control plate is restrained from rotation relative to said central axis.

3. Apparatus as claimed in claim 1 wherein said actuating element comprises a ring positioned within said exterior cover and capable of rotatable movement about said central axis for providing linear input to said control plate, said mixing valve further comprising a tab extending from said ring to the outside of said exterior cover for direct operator manipulation.

4. Apparatus as claimed in claim 3 wherein said exterior cover has opposing slots 180 degrees from one another and said plate has a pair of radially extending tabs received in said slots for permitting movement radially with respect to said central axis for restraining said control plate from rotational movement.

5. Apparatus as claimed in claim 4 wherein said exterior cover has a lip extending downward toward said plate adjacent said stem, said pair of slots being formed in said lip which receive the tabs extending from said plate, said actuating ring and said cam surface being positioned in the annular space defined between said lip and said exterior cover.

6. Apparatus as claimed in claim 5 wherein said actuating ring has a pair of inwardly facing cam surfaces, one of which is substantially circular in shape and the other of which has an increasing radius relative to said central axis,
    one of the tabs on said plate having an end surface with a shape conforming to the circular cam surface and the other tab having an end surface conforming to the contour of the increasing radius cain surface but at the radially inward section thereof,
    whereby when said ring is rotated to engage the minimum radius surface in said cam surface, the limit on motion of said stem is in place and when said cam surface is rotated from that surface the stem is free to move without said limit.

7. Apparatus as claimed in claim 1 wherein said actuating element is integral with said exterior cover and said cam surface is formed on the interior of said exterior cover.

8. Apparatus as claimed in claim 7 wherein said plate is restrained from rotation about said central axis.

9. Apparatus as claimed in claim 8 wherein said mixing valve further comprises a housing on which said exterior cover is mounted for relative circular movement and said plate has a plurality of guide protrusions extending in a direction parallel to said central axis, said base having a pair of parallel grooves receiving said tabs for restraining movement of said plate to a radial direction relative to said central axis.

10. Apparatus as claimed in claim 9 wherein said exterior cover has a pair of inwardly facing vain surfaces, one of which is substantially circular in shape, and the other of which has an increasing radius relative to said central axis, said plate has a pair of tabs extending radially therefrom and received in said cam surfaces, one of said tabs being configured with an end surface conforming to the constant radius cam surface and the other tab having an end surface conforming to the cam surface having the increasing radius but at the minimum radius section, whereby when said exterior cover is rotated to said minimum radius position, a limit is placed on said stem and when the housing is rotated from that position the stem is free to move.

* * * * *